(12) United States Patent
Suzuki et al.

(10) Patent No.: US 11,820,118 B2
(45) Date of Patent: *Nov. 21, 2023

(54) LAMINATION DEVICE (71) Applicant: Murata Manufacturing Co., Ltd., Kyoto-fu (JP)

(72) Inventors: Arata Suzuki, Nagaokakyo (JP); Kouhei Fukuda, Nagaokakyo (JP); Kodai Murata, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/050,717

(22) Filed: Oct. 28, 2022

(65) Prior Publication Data

US 2023/0072704 A1  Mar. 9, 2023

Related U.S. Application Data

(63) Continuation of application No. PCT/JP2021/015015, filed on Apr. 9, 2021.

(30) Foreign Application Priority Data

Apr. 30, 2020  (JP) .................. 2020-080042

(51) Int. Cl.
*B32B 41/00* (2006.01)
*B32B 37/00* (2006.01)
(Continued)

(52) U.S. Cl.
CPC .......... *B32B 41/00* (2013.01); *B32B 37/0046* (2013.01); *B32B 39/00* (2013.01);
(Continued)

(58) Field of Classification Search
CPC ..... B32B 41/00; B32B 37/0046; B32B 39/00; B32B 2041/04; B32B 2309/72;
(Continued)

(56) References Cited

U.S. PATENT DOCUMENTS

| 2015/0069109 A1* | 3/2015 | Mori ................. H01M 10/0436 |
| | | 156/379.7 |
| 2021/0202976 A1* | 7/2021 | Abe .................. H01M 10/0468 |
| 2023/0080579 A1* | 3/2023 | Suzuki ................... B65G 15/02 |
| | | 156/361 |

FOREIGN PATENT DOCUMENTS

| JP | H02-27769 U | 2/1990 |
| JP | 2000-147044 A | 5/2000 |

(Continued)

OTHER PUBLICATIONS

International Search Report issued in PCT/JP2021/015015; dated Jun. 29, 2021.

*Primary Examiner* — Michael N Orlando
*Assistant Examiner* — Joshel Rivera
(74) *Attorney, Agent, or Firm* — Studebaker & Brackett PC (57) ABSTRACT

A lamination device that laminates a plurality of types of workpieces includes a plurality of supply mechanisms that supply a workpiece to each of a plurality of supply positions, a movement mechanism including a stator of a linear motor having a predetermined traveling track and a mover of a linear motor that is movable between a plurality of the supply positions along a traveling track, and a control unit that controls at least the mover. The mover includes a lamination stage for laminating the workpiece. The control unit corrects a relative position of the workpiece supplied to the supply positions with respect to the lamination stage, laminates the workpiece whose relative position is corrected on the lamination stage, and controls the mover so as to (Continued)

move to a next one of the supply positions after lamination of the workpiece.

23 Claims, 9 Drawing Sheets

(51) Int. Cl.
*B32B 39/00* (2006.01)
*H01M 10/04* (2006.01)

(52) U.S. Cl.
CPC ..... *H01M 10/0404* (2013.01); *B32B 2041/04* (2013.01); *B32B 2309/72* (2013.01); *B32B 2457/10* (2013.01)

(58) Field of Classification Search
CPC .......... B32B 2457/10; B32B 38/1833; H01M 10/0404; B65H 31/3063; B65H 31/24; B65H 2801/72; Y02E 60/10; Y02P 70/50; B65G 57/04

USPC .................... 156/60, 64, 350, 351, 378, 379
See application file for complete search history.

(56) References Cited

FOREIGN PATENT DOCUMENTS

| | | |
|---|---|---|
| JP | 2016-033868 A | 3/2016 |
| JP | 2016-197527 A | 11/2016 |
| JP | 2017-047679 A | 3/2017 |
| JP | 2019-215977 A | 12/2019 |
| JP | 2020-047401 A | 3/2020 |
| JP | 2020-064812 A | 4/2020 |
| WO | 2014/188607 A1 | 11/2014 |
| WO | 2019/052882 A1 | 3/2019 |

* cited by examiner

LAMINATION DEVICE

CROSS-REFERENCE TO RELATED APPLICATIONS

This application claims benefit of priority to International Patent Application No. PCT/JP2021/015015, filed Apr. 9, 2021, and to Japanese Patent Application No. 2020-080042, filed Apr. 30, 2020, the entire contents of each are incorporated herein by reference.

BACKGROUND

Technical Field

The present disclosure relates to a lamination device that laminates a plurality of types of workpieces.

Background Art

Conventionally, a lamination device that laminates a plurality of types of workpieces in a predetermined order is known.

As one of such lamination devices, Japanese Patent Application Laid-Open No. 2019-215977 describes a lamination device that laminates sheet-shaped workpieces that are battery materials such as a positive electrode, a negative electrode, and a separator. The lamination device includes a conveyance mechanism that conveys a workpiece in a predetermined direction, a transfer mechanism that transfers a workpiece, and a lamination mechanism that laminates a workpiece, and is configured to transfer, by the transfer mechanism, a workpiece conveyed by a conveyance mechanism and laminate the workpiece by the lamination mechanism. The transfer mechanism includes a stator of a linear motor having a predetermined traveling track and movers of a plurality of linear motors provided in the stator, and the movers move to the lamination mechanism in a state of holding a workpiece by a holding member. Japanese Patent Application Laid-Open No. 2019-215977 describes that sheet-shaped workpieces can be laminated at high speed by such a configuration.

SUMMARY

However, in the lamination device described in Japanese Patent Application Laid-Open No. 2019-215977, a process of transferring a workpiece from the conveyance mechanism to the transfer mechanism and a process of transferring a workpiece from the transfer mechanism to the lamination mechanism are required, and there is room for improvement in order to shorten lamination time of a workpiece.

Accordingly, the present disclosure provides a lamination device capable of shortening lamination time of a workpiece.

A lamination device according to the present disclosure is a lamination device that laminates a plurality of types of workpieces. The lamination device includes a plurality of supply mechanisms that supply the workpiece to each of a plurality of supply positions; a movement mechanism including a stator of a linear motor having a predetermined traveling track and a mover of a linear motor movable between a plurality of the supply positions along the traveling track; and a control unit that controls at least the mover. The mover includes a lamination stage for laminating the workpieces, and the control unit corrects a relative position of the workpiece supplied to the supply position with respect to the lamination stage, laminates the workpiece whose relative position is corrected on the lamination stage, and controls the mover to move to a next one of the supply positions after laminating the workpiece.

According to the lamination device of the present disclosure, a relative position of a workpiece supplied to a supply position by the supply mechanism with respect to the lamination stage is corrected, and the workpiece whose relative position is been corrected is laminated on the lamination stage of the mover. After the above, the mover moves to a next supply position. That is, since a process of transferring a workpiece to another mechanism only needs to be performed once, which is from the supply mechanism to the movement mechanism, lamination time of a workpiece can be shortened.

DETAILED DESCRIPTION

Hereinafter, a feature of the present disclosure will be specifically described with reference to an embodiment of the present disclosure.

First Embodiment

Figure 1:
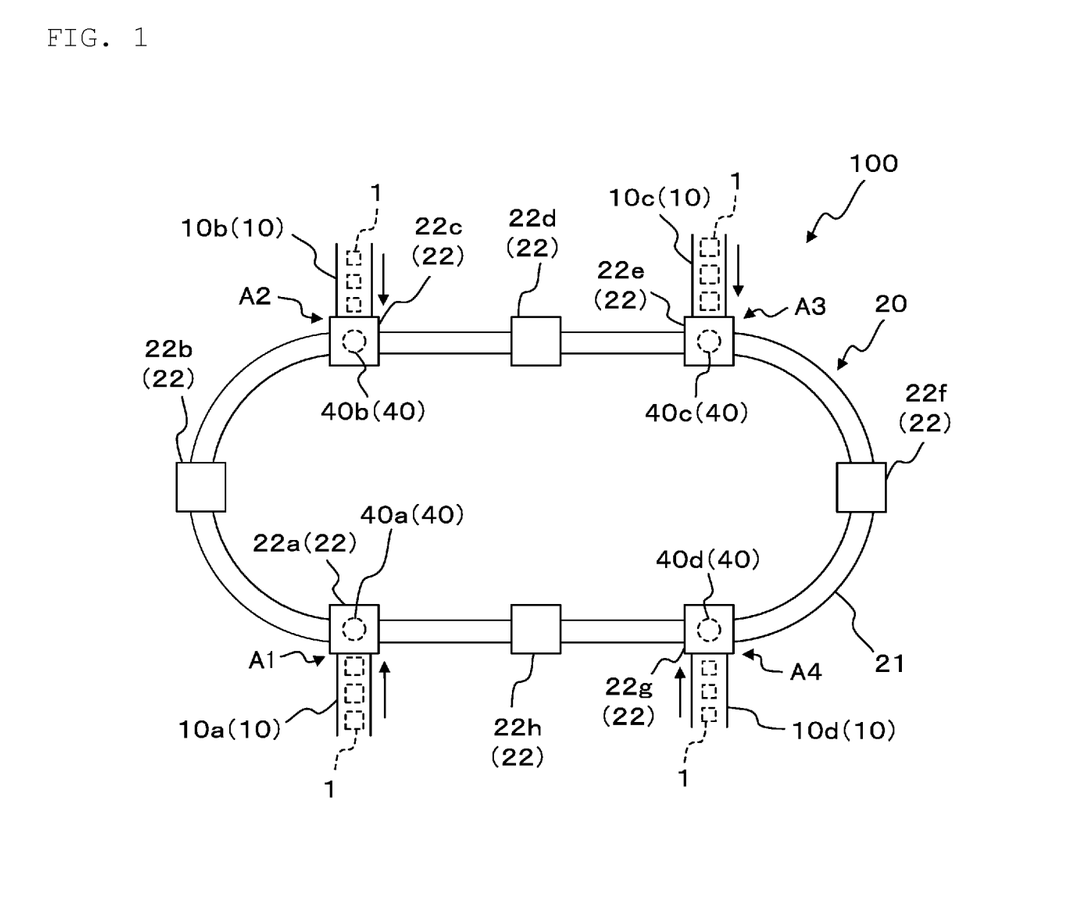
FIG. 1 is a plan view schematically illustrating a configuration of a lamination device according to a first embodiment.

FIG. 1 is a plan view schematically illustrating a configuration of a lamination device 100 according to a first embodiment. The lamination device 100 in the first embodiment includes a plurality of supply mechanisms 10, a movement mechanism 20, and a control unit 30 (see FIG. 3). Here, an example in which a workpiece 1, which is an object to be laminated by the lamination device 100, is a sheet-shaped battery material will be described.

A plurality of the supply mechanisms 10 supply the workpiece 1 to each of a plurality of supply positions A1 to A4. The workpiece 1 of one type is supplied to each of a plurality of the supply positions A1 to A4. In the present embodiment, a plurality of the supply mechanisms 10 include four supply mechanisms of a first supply mechanism 10a, a second supply mechanism 10b, a third supply mechanism 10c, and a fourth supply mechanism 10d. However, the number of a plurality of the supply mechanisms 10 is not limited to four.

The first supply mechanism 10a supplies a resin film as the workpiece 1 to the first supply position A1. The resin film is a sheet-shaped battery material that functions as a separator, and is made from, for example, polyethylene. In the present embodiment, the first supply mechanism 10a is a belt conveyor, and conveys and supplies the workpiece 1 sucked to a lower surface of a belt to the first supply position A1. The suction is performed, for example, by sucking the workpiece 1.

The second supply mechanism 10b supplies first metal foil as the workpiece 1 to the second supply position A2. The first metal foil is a sheet-shaped battery material that functions as one of a positive electrode and a negative electrode, and is made from, for example, aluminum. In the present embodiment, the second supply mechanism 10b is a belt conveyor, and conveys and supplies the workpiece 1 sucked to a lower surface of a belt to the second supply position A2.

The third supply mechanism 10c supplies a resin film as the workpiece 1 to the third supply position A3. The resin film is a sheet-shaped battery material that functions as a separator, and is made from, for example, polyethylene. As the resin film supplied by the third supply mechanism 10c, the same resin film as the resin film supplied by the first supply mechanism 10a can be used. However, a film different from the resin film supplied by the first supply mechanism 10a may be used. In the present embodiment, the third supply mechanism 10c is a belt conveyor, and conveys and supplies the workpiece 1 sucked to a lower surface of the belt to the third supply position A3.

The fourth supply mechanism 10d supplies second metal foil as the workpiece 1 to the fourth supply position A4. The second metal foil is a sheet-shaped battery material that functions as the other electrode of the positive electrode and the negative electrode, and is made from, for example, aluminum. In the present embodiment, the fourth supply mechanism 10d is a belt conveyor, and conveys and supplies the workpiece 1 sucked to a lower surface of the belt to the fourth supply position A4.

Note that the first supply mechanism 10a, the second supply mechanism 10b, the third supply mechanism 10c, and the fourth supply mechanism 10d are not limited to belt conveyors, and may have any structure that can convey and supply the workpiece 1.

Further, instead of conveying the workpiece 1 divided into pieces by the supply mechanism 10, the workpiece 1 having long size may be conveyed to and cut at the supply positions A1 to A4 to be divided into pieces. Note that, in the present embodiment, the shape of the workpiece 1 is a rectangular shape, but may be a shape other than the rectangular shape.

The movement mechanism 20 includes a stator 21 of a linear motor having a predetermined traveling track, and a mover 22 of a linear motor that is movable between a plurality of the supply positions A1 to A4 along the traveling track. In the present embodiment, the traveling track of the stator 21 has an elliptical annular shape in plan view as illustrated in FIG. 1. However, the shape of the traveling track in plan view is not limited to the elliptical annular shape.

In the present embodiment, the mover 22 includes a first mover 22a, a second mover 22b, a third mover 22c, a fourth mover 22d, a fifth mover 22e, a sixth mover 22f, a seventh mover 22g, and an eighth mover 22h. That is, the number of the movers 22 is twice the number of the supply mechanisms 10. Each of the movers 22a to 22h can move independently.

Figure 2:
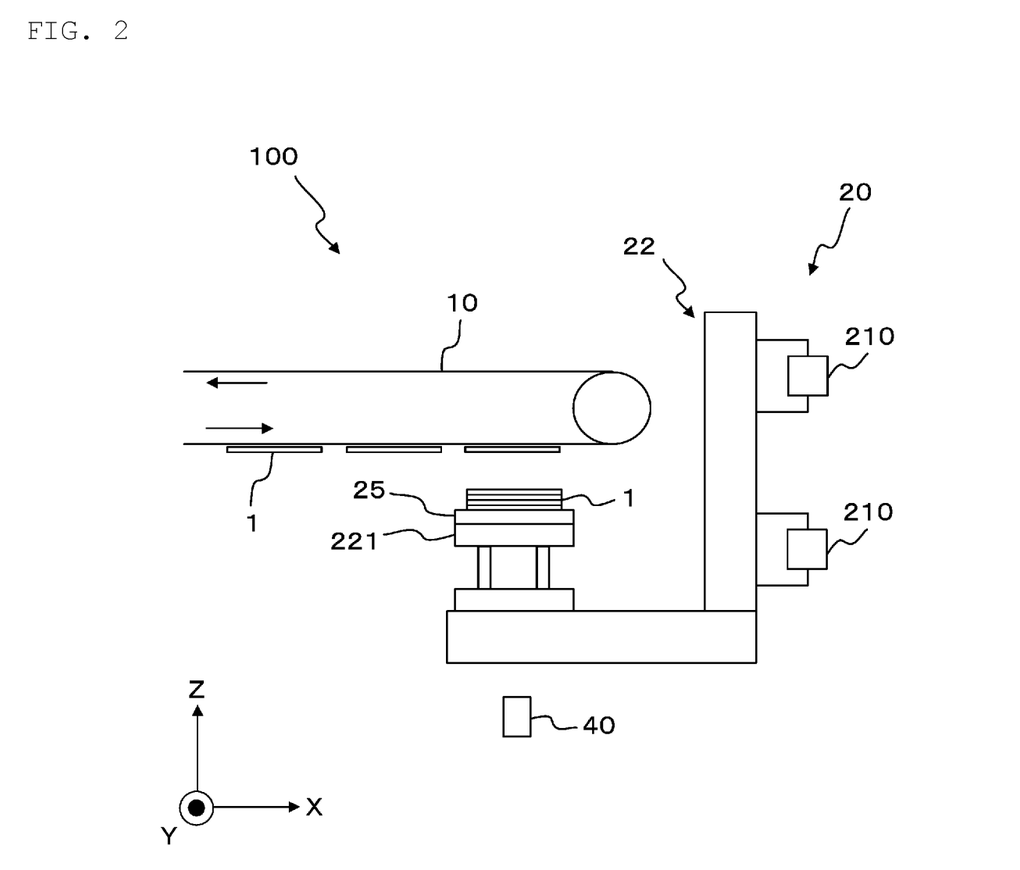
FIG. 2 is a diagram schematically illustrating a configuration of a mover of a movement mechanism when viewed in a direction along a traveling track of a stator.

FIG. 2 is a diagram schematically illustrating a configuration of the mover 22 of the movement mechanism 20 when viewed in a direction along the traveling track of the stator 21. As illustrated in FIG. 2, the mover 22 includes a lamination stage 221 for laminating the workpiece 1. Note that, in FIG. 2, the X-axis direction is a direction in which the supply mechanism 10 conveys the workpiece 1, and the Y-axis direction is a direction in which the mover 22 moves along the traveling track. Further, the Z-axis direction is a vertical direction.

The lamination stage 221 is for laminating the workpieces 1 supplied to the supply positions A1 to A4 by the supply mechanism 10. In the present embodiment, a jig 25 is supplied onto the lamination stage 221 by a jig supply and discharge mechanism 50 (see FIG. 6C) to be described later, and the workpiece 1 is laminated on the jig 25. As illustrated in FIGS. 6B and 6C, the jig 25 is preferably provided with a chucking jaw 26 for holding the laminated workpiece 1.

For example, the jig 25 is provided with a pair of the chucking jaws 26 facing each other so as to sandwich the workpiece 1. The chucking jaw 26 has a workpiece pressing surface 26a parallel to a surface on which the workpiece 1 is laminated of the jig 25. The workpiece 1 is supplied between a pair of the chucking jaws 26 on the jig 25, and is pressed from above in contact with the workpiece pressing surface 26a of the chucking jaw 26 as illustrated in FIG. 6C. Since the laminated workpiece 1 is pressed by the chucking jaw 26, it is possible to suppress positional displacement of the laminated workpiece 1. Further, since the workpiece 1 is pressed not by a point but by a surface, it is possible to prevent the workpiece 1 from being scratched. However, the workpiece 1 may be laminated on the lamination stage 221 without using the jig 25.

In the present embodiment, as illustrated in FIG. 2, the mover 22 is attached to two guide rails 210 of the stator 21 forming the traveling track and moves along the guide rails 210. As illustrated in FIG. 2, the guide rail 210 of the stator 21 is provided not vertically below the mover 22 but on the side. In a structure in which the guide rail 210 is provided vertically below the mover 22, it is necessary to perform control in consideration of a turning radius difference between two of the guide rails 210, but in the structure provided on the side, it is not necessary to consider the turning radius difference, and the control becomes simple.

Figure 3:
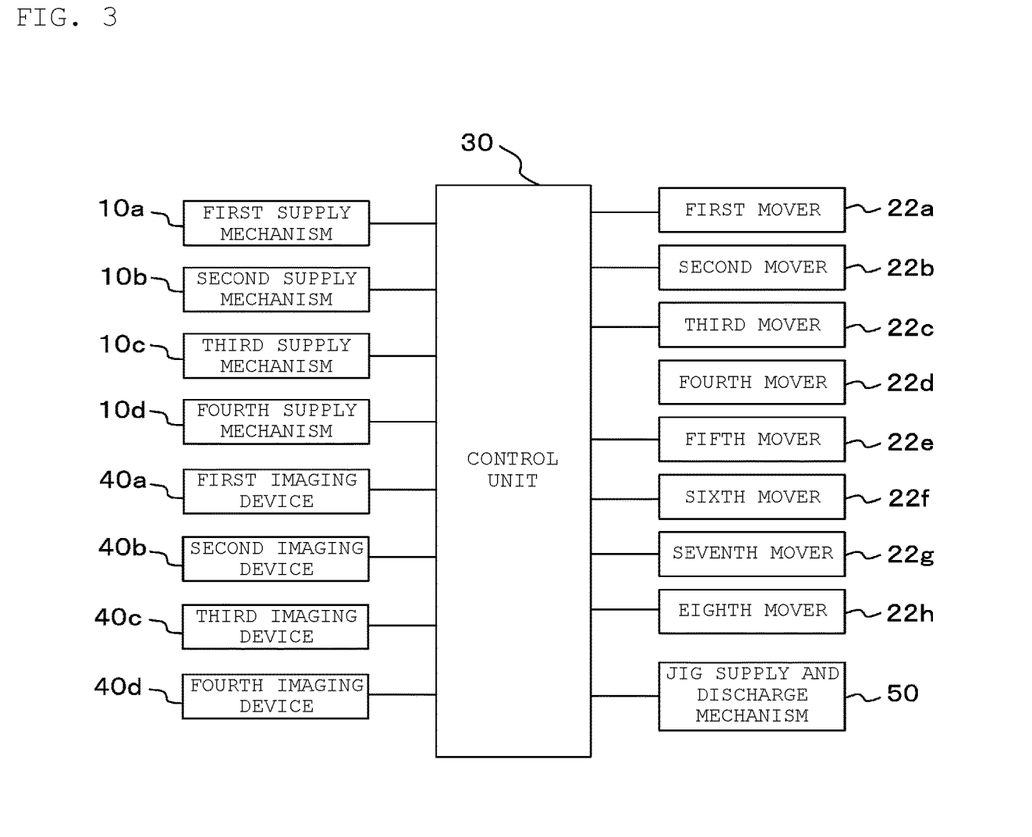
FIG. 3 is a block diagram illustrating a connection relationship with a control unit.

FIG. 3 is a block diagram illustrating a connection relationship with the control unit 30. As illustrated in FIG. 3, the control unit 30 is connected to the first supply mechanism 10a, the second supply mechanism 10b, the third supply mechanism 10c, the fourth supply mechanism 10d, the first mover 22a, the second mover 22b, the third mover 22c, the fourth mover 22d, the fifth mover 22e, the sixth mover 22f, the seventh mover 22g, the eighth mover 22h, a first imaging device 40a, a second imaging device 40b, a third imaging device 40c, and a fourth imaging device 40d to be described later, and the jig supply and discharge mechanism 50 to be described later.

The control unit 30 controls at least the mover 22. Specifically, the control unit 30 corrects a relative position of the workpiece 1 supplied to the supply positions A1 to A4 by the supply mechanism 10 with respect to the lamination stage 221, laminates the workpiece 1 whose relative position is corrected on the lamination stage 221, and controls the mover 22 so as to move to a next one of the supply positions A1 to A4 after the lamination of the workpiece 1. In the lamination device 100 of the embodiment, the control unit 30 moves the lamination stage 221 in order to correct a relative position of the workpiece 1 with respect to the lamination stage 221.

The lamination device 100 in the present embodiment further includes an imaging device 40 that images the workpiece 1 supplied by the supply mechanism 10. The imaging device 40 is provided vertically below the workpiece 1 at the supply positions A1 to A4 (see FIG. 2), and images the workpiece 1 in a state of being supplied to the supply positions A1 to A4 by the supply mechanism 10 and stopped.

Figure 4A:
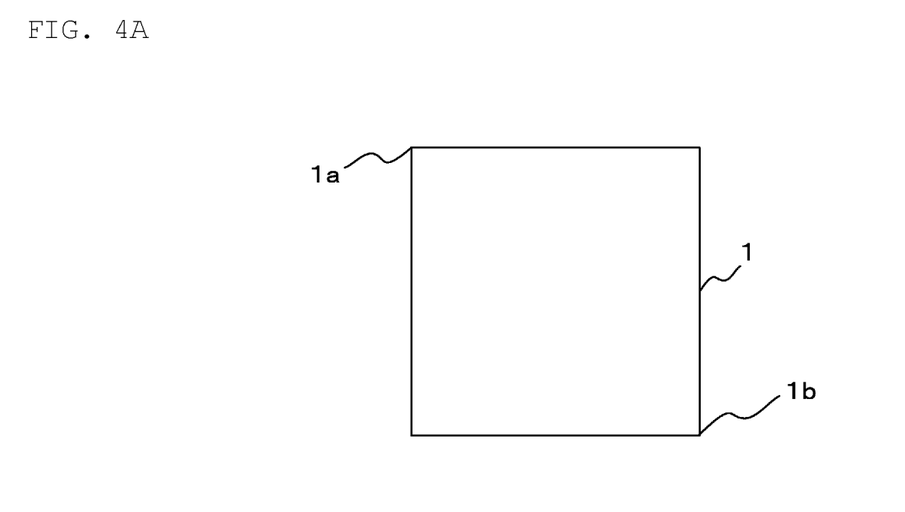
FIG. 4A is a diagram for explaining a method of grasping a position and a posture of a workpiece captured by an imaging device.

The imaging device 40 images the workpiece 1 in order to grasp a position and a posture of the workpiece 1. For example, if it is possible to image the workpiece 1 having a rectangular shape by the imaging device 40 and to grasp positions of a first corner 1a and a second corner 1b (see FIG. 4A) located diagonally on the outer periphery of the workpiece 1, it is possible to grasp a position and a posture of the workpiece 1.

Figure 4B:
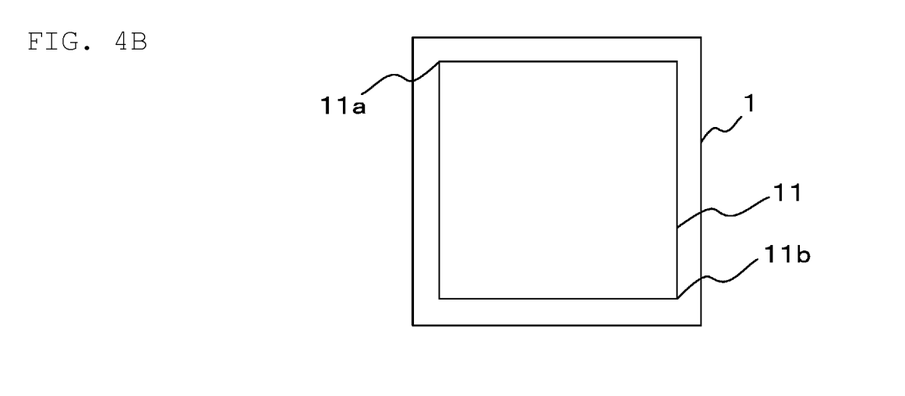
FIG. 4B is a diagram for explaining a method of grasping a position and a posture of a workpiece by imaging an alignment mark formed on the workpiece by the imaging device.

However, it is not necessary to image an entire shape of the workpiece 1 by the imaging device 40, and the configuration may be such that only a part of the workpiece 1 is imaged as long as a position and a posture of the workpiece 1 can be grasped. As an example, as illustrated in FIG. 4B, an alignment mark 11 for grasping a position and a posture of the workpiece 1 is formed on the workpiece 1, and the alignment mark 11 may be imaged by the imaging device 40. In this case, if positions of a first corner 11a and a second corner 11b located on a diagonal line of the alignment mark 11 can be grasped, a position and a posture of the workpiece 1 can be grasped.

Note that the imaging of the workpiece 1 by the imaging device 40 is performed before the mover 22 moves to the supply positions A1 to A4. That is, FIG. 2 illustrates a state in which the imaging device 40 images the workpiece 1 and then the mover 22 moves to the supply positions A1 to A4.

In the present embodiment, there are four of the supply positions A1 to A4 of the workpieces 1 in order to supply four types of the workpieces 1. Therefore, four of the imaging devices 40 are provided corresponding to four of the supply positions A1 to A4. Specifically, the first imaging device 40a is provided vertically below the first supply position A1, the second imaging device 40b is provided vertically below the second supply position A2, the third imaging device 40c is provided vertically below the third supply position A3, and the fourth imaging device 40d is provided vertically below the fourth supply position A4.

The control unit 30 corrects a relative position of the workpiece 1 with respect to the lamination stage 221 by moving the lamination stage 221 on the basis of an image of the workpiece 1 captured by the imaging device 40. By moving the lamination stage 221 based on the image of the workpiece 1, position correction according to an actual position and posture of the workpiece 1 can be performed.

In this manner, it is possible to obtain a laminate in which positional displacement of a plurality of types of the workpieces 1 is more effectively suppressed. However, the method of correcting a relative position of the workpiece 1 with respect to the lamination stage 221 is not limited to the method performed based on an image of the workpiece 1.

Figure 5:
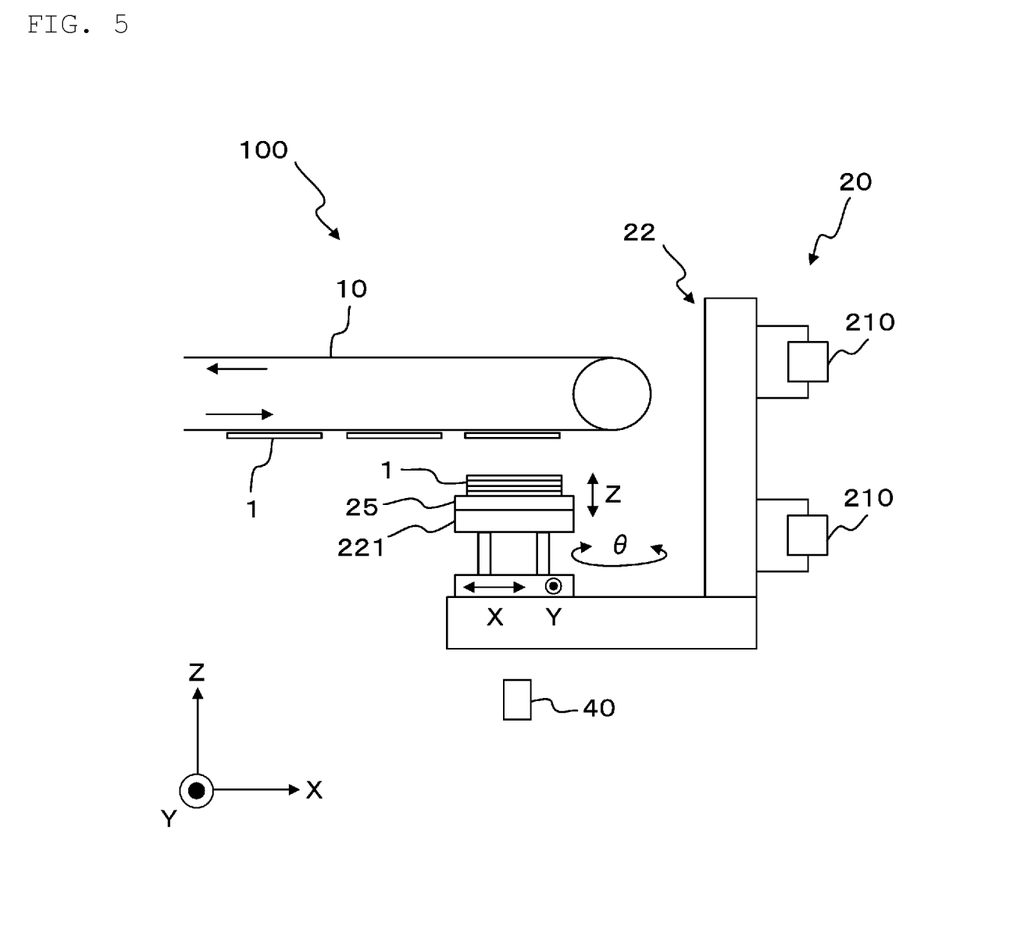
FIG. 5 is a diagram for explaining a method of correcting a relative position of a workpiece with respect to a lamination stage in the lamination device according to the first embodiment.

FIG. 5 is a diagram for explaining a method of correcting a relative position of the workpiece 1 with respect to the lamination stage 221 in the lamination device 100 according to the first embodiment.

The lamination stage 221 is configured to be movable in an X-axis direction, which is a direction in which the workpiece 1 is conveyed by the supply mechanism 10, a Y-axis direction orthogonal to the X-axis, a Z-axis direction, which is a vertical direction, and a θ direction, which is a rotation direction around the center of the lamination stage 221 on an XY plane.

The control unit 30 corrects a relative position of the workpiece 1 with respect to the lamination stage 221 by moving the lamination stage 221 in at least one of the X-axis direction, the Y-axis direction, and the θ direction on the basis of an image of the workpiece 1 captured by the imaging device 40. Specifically, a relative position of the workpiece 1 with respect to the lamination stage 221 is corrected by moving the lamination stage 221 in at least one of the X-axis direction, the Y-axis direction, and the θ direction such that the workpiece 1 and the lamination stage 221 overlap each other when viewed from the Z-axis direction. Then, when the relative position correction of the workpiece 1 with respect to the lamination stage 221 is completed, the control unit 30 raises the lamination stage 221 until the workpiece 1 at the supply positions A1 to A4 and the workpiece 1 laminated on the jig 25 on the lamination stage 221 come into contact with each other. However, in a case where the workpiece 1 is not laminated on the jig 25, the lamination stage 221 is raised until the workpiece 1 at the supply positions A1 to A4 and the jig 25 come into contact with each other. At this time, a moving amount in the Z-axis direction, that is, a raising amount, of the lamination stage 221 is controlled based on the number of the laminated workpieces 1 laminated on the lamination stage 221.

After the above, the control unit 30 controls the supply mechanism 10 so as to release suction of the workpiece 1 at the supply positions A1 to A4, so as to laminate the workpiece 1 on the lamination stage 221, more specifically, on the jig 25 on the lamination stage 221.

Hereinafter, a method of sequentially laminating four types of the workpieces 1 by the lamination device 100 according to the first embodiment will be described. Here, operation in which the first mover 22a of eight of the movers 22 laminates the workpiece 1 will be described. However, the same applies to operation in which the other movers 22b to 22h laminate the workpiece 1. That is, assuming that T is time during which the first mover 22a makes one round on the traveling track of the stator 21, the same operation as the first mover 22a is performed by the eighth mover 22h at a timing delayed by T/8, the seventh mover 22g at a timing delayed by (2T)/8, the sixth mover 22f at a timing delayed by (3T)/8, the fifth mover 22e at a timing delayed by (4T)/8, the fourth mover 22d at a timing delayed by (5T)/8, the third mover 22c at a timing delayed by (6T)/8, and the second mover 22b at a timing delayed by (7T)/8.

(S1) The control unit 30 controls the first supply mechanism 10a so that a resin film as the workpiece 1 is supplied to the first supply position A1. Further, the control unit 30 controls the first imaging device 40a to image the workpiece 1 stopped at the first supply position A1.

(S2) Subsequently, the control unit 30 stops the first mover 22a at the first supply position A1, corrects a relative position of the workpiece 1 with respect to the lamination stage 221 on the basis of an image of the workpiece 1 captured by the first imaging device 40a, and controls the first mover 22a such that the workpiece 1 whose relative position is corrected is laminated on the jig 25 on the lamination stage 221. Specifically, the control unit 30 corrects a relative position of the workpiece 1 with respect to the lamination stage 221 by moving the lamination stage 221 in at least one of the X-axis direction, the Y-axis direction, and the θ direction on the basis of an image of the workpiece 1 captured by the first imaging device 40a. In a case where the position correction is completed, the control unit 30 raises the lamination stage 221 until the workpiece 1 on the jig 25 (in a case where the workpiece 1 is not laminated, the jig 25) abuts on the workpiece 1 at the first supply position A1. At this time, the control unit 30 controls a moving amount in the Z-axis direction, that is, a raising amount of the lamination stage 221 based on the number of the laminated workpieces 1 laminated on the lamination stage 221, more specifically, on the jig 25.

After the above, the control unit 30 causes the first supply mechanism 10a to release suction of the workpiece 1 at the first supply position A1. In this manner, the workpiece 1 at the first supply position A1 is laminated on the jig 25 on the lamination stage 221. At this time, the workpiece 1 is preferably held by the chucking jaw 26 of the jig 25.

Note that, when the first mover 22a is stopped at the first supply position A1, the third mover 22c is stopped at the second supply position A2, the fifth mover 22e is stopped at the third supply position A3, and the seventh mover 22g is stopped at the fourth supply position A4. Similarly to the first mover 22a, each of the third mover 22c, the fifth mover 22e, and the seventh mover 22g corrects a relative position of the workpiece 1 supplied at each of the supply positions A1 to A4 with respect to the lamination stage 221, laminates the workpiece 1 on the lamination stage 221, and moves to a next one of the supply positions A1 to A4 as described later.

Further, when the first mover 22a is stopped at the first supply position A1, the second mover 22b is located between the first supply position A1 and the second supply position A2, the fourth mover 22d is located between the second supply position A2 and the third supply position A3, the sixth mover 22f is located between the third supply position A3 and the fourth supply position A4, and the eighth mover 22h is located between the fourth supply position A4 and the first supply position A1.

(S3) Subsequently, the control unit 30 moves the first mover 22a from the first supply position A1 to the second supply position A2 along the traveling track. At this time, the control unit 30 not only moves the first mover 22a from the first supply position A1 to the second supply position A2, but also moves the third mover 22c from the second supply position A2 to the third supply position A3, moves the fifth mover 22e from the third supply position A3 to the fourth supply position A4, and moves the seventh mover 22g from the fourth supply position A4 to the first supply position A1.

(S4) Subsequently, the control unit 30 controls the second supply mechanism 10b so that the first metal foil as the workpiece 1 is supplied to the second supply position A2. Further, the control unit 30 controls the second imaging device 40b to image the workpiece 1 stopped at the second supply position A2.

(S5) Subsequently, the control unit 30 stops the first mover 22a at the second supply position A2, corrects a relative position of the workpiece 1 with respect to the lamination stage 221 on the basis of an image of the workpiece 1 captured by the second imaging device 40b, and controls the first mover 22a such that the workpiece 1 whose relative position is corrected is laminated on the jig 25 on the lamination stage 221. Specifically, the control unit 30 corrects a relative position of the workpiece 1 with respect to the lamination stage 221 by moving the lamination stage 221 in at least one of the X-axis direction, the Y-axis direction, and the θ direction on the basis of the image of the workpiece 1 captured by the second imaging device 40b, and when the position correction is completed, raises the lamination stage 221 until the workpiece 1 on the jig 25 abuts on the workpiece 1 at the second supply position A2. At this time, the control unit 30 controls a moving amount in the Z-axis direction, that is, a raising amount of the lamination stage 221 based on the number of the laminated workpieces 1 laminated on the lamination stage 221, more specifically, on the jig 25.

After the above, the control unit 30 causes the second supply mechanism 10b to release suction of the workpiece 1 at the second supply position A2. In this manner, the workpiece 1 at the second supply position A2 is laminated on the workpiece 1 on the lamination stage 221, more specifically, on the jig 25. At this time, holding of the workpiece 1 by the chucking jaw 26 of the jig 25 is preferably released once so that the workpiece 1 at the second supply position A2 is laminated, and then all the laminated workpieces 1 are preferably held again by the chucking jaw 26.

Note that, when the first mover 22a is stopped at the second supply position A2, the third mover 22c is stopped at the third supply position A3, the fifth mover 22e is stopped at the fourth supply position A4, and the seventh mover 22g is stopped at the first supply position A1. Further, the second mover 22b is located between the second supply position A2 and the third supply position A3, the fourth mover 22d is located between the third supply position A3 and the fourth supply position A4, the sixth mover 22f is located between the fourth supply position A4 and the first supply position A1, and the eighth mover 22h is located between the first supply position A1 and the second supply position A2.

(S6) Subsequently, the control unit 30 moves the first mover 22a from the second supply position A2 to the third supply position A3 along the traveling track. At this time, the control unit 30 not only moves the first mover 22a from the second supply position A2 to the third supply position A3, but also moves the third mover 22c from the third supply position A3 to the fourth supply position A4, moves the fifth mover 22e from the fourth supply position A4 to the first supply position A1, and moves the seventh mover 22g from the first supply position A1 to the second supply position A2.

(S7) Subsequently, the control unit 30 controls the third supply mechanism 10c so that a resin film as the workpiece 1 is supplied to the third supply position A3. Further, the control unit 30 controls the third imaging device 40c to image the workpiece 1 stopped at the third supply position A3.

(S8) Subsequently, the control unit 30 stops the first mover 22a at the third supply position A3, corrects a relative position of the workpiece 1 with respect to the lamination stage 221 on the basis of an image of the workpiece 1 captured by the third imaging device 40c, and controls the first mover 22a such that the workpiece 1 whose relative position is corrected is laminated on the jig 25 on the lamination stage 221. Specifically, the control unit 30 corrects a relative position of the workpiece 1 with respect to the lamination stage 221 by moving the lamination stage 221 in at least one of the X-axis direction, the Y-axis direction, and the θ direction based on an image of the workpiece 1 captured by the third imaging device 40c. When the position correction is completed, the control unit 30 raises the lamination stage 221 until the workpiece 1 on the jig 25 abuts on the workpiece 1 at the third supply position A3. At this time, the control unit 30 controls a moving amount in the Z-axis direction, that is, a raising amount of the lamination stage 221 based on the number of the laminated workpieces 1 laminated on the lamination stage 221, more specifically, on the jig 25.

After the above, the control unit 30 causes the third supply mechanism 10c to release suction of the workpiece 1 at the third supply position A3. In this manner, the workpiece 1 at the third supply position A3 is laminated on the workpiece 1 on the lamination stage 221, more specifically, on the jig 25. At this time, holding of the workpiece 1 by the chucking jaw 26 of the jig 25 is preferably released once so that the workpiece 1 at the third supply position A3 is laminated, and then all the laminated workpieces 1 are preferably held again by the chucking jaw 26.

Note that, when the first mover 22a is stopped at the third supply position A3, the third mover 22c is stopped at the fourth supply position A4, the fifth mover 22e is stopped at the first supply position A1, and the seventh mover 22g is stopped at the second supply position A2. Further, the second mover 22b is located between the third supply position A3 and the fourth supply position A4, the fourth mover 22d is located between the fourth supply position A4 and the first supply position A1, the sixth mover 22f is located between the first supply position A1 and the second supply position A2, and the eighth mover 22h is located between the second supply position A2 and the third supply position A3.

(S9) Subsequently, the control unit 30 moves the first mover 22a from the third supply position A3 to the fourth supply position A4 along the traveling track. At this time, the control unit 30 not only moves the first mover 22a from the third supply position A3 to the fourth supply position A4, but also moves the third mover 22c from the fourth supply position A4 to the first supply position A1, moves the fifth mover 22e from the first supply position A1 to the second supply position A2, and moves the seventh mover 22g from the second supply position A2 to the third supply position A3.

(S10) Subsequently, the control unit 30 controls the fourth supply mechanism 10d so that the second metal foil as the workpiece 1 is supplied to the fourth supply position A4. Further, the control unit 30 controls the fourth imaging device 40d to image the workpiece 1 stopped at the fourth supply position A4.

(S11) The control unit 30 stops the first mover 22a at the fourth supply position A4, corrects a relative position of the workpiece 1 with respect to the lamination stage 221 on the basis of an image of the workpiece 1 captured by the fourth imaging device 40d, and controls the first mover 22a such that the workpiece 1 whose relative position is corrected is laminated on the jig 25 on the lamination stage 221. Specifically, the control unit 30 corrects a relative position of the workpiece 1 with respect to the lamination stage 221 by moving the lamination stage 221 in at least one of the X-axis direction, the Y-axis direction, and the θ direction on the basis of an image of the workpiece 1 captured by the fourth imaging device 40d. When the position correction is completed, the control unit 30 raises the lamination stage 221 until the workpiece 1 on the jig 25 abuts on the workpiece 1 at the fourth supply position A4. At this time, the control unit 30 controls a moving amount in the Z-axis direction, that is, a raising amount of the lamination stage 221 based on the number of the laminated workpieces 1 laminated on the lamination stage 221, more specifically, on the jig 25.

After the above, the control unit 30 causes the fourth supply mechanism 10d to release suction of the workpiece 1 at the fourth supply position A4. In this manner, the workpiece 1 at the fourth supply position A4 is laminated on the workpiece 1 on the lamination stage 221, more specifically, on the jig 25. At this time, holding of the workpiece 1 by the chucking jaw 26 of the jig 25 is preferably released once so that the workpiece 1 at the fourth supply position A4 is laminated, and then all the laminated workpieces 1 are preferably held again by the chucking jaw 26.

(S12) The control unit 30 moves the first mover 22a from the fourth supply position A4 to the first supply position A1 along the traveling track. At this time, the control unit 30 not only moves the first mover 22a from the fourth supply position A4 to the first supply position A1, but also moves the third mover 22c from the first supply position A1 to the second supply position A2, moves the fifth mover 22e from the second supply position A2 to the third supply position A3, and moves the seventh mover 22g from the third supply position A3 to the fourth supply position A4.

By the processes (S1) to (S12) described above, a set of semi-finished products in which the resin film, the first metal foil, the resin film, and the second metal foil, which are four types of the workpieces 1, are laminated in this order is obtained. After the above, by repeatedly performing the processes (S1) to (S12), a product in which a predetermined number of sets are laminated, that is, a laminate in which a plurality of positive electrodes and a plurality of negative electrodes are alternately laminated with a resin film functioning as a separator interposed between them is obtained. The laminate is used, for example, as a constituent material of an assembled battery.

The lamination device 100 according to the present embodiment further includes the jig supply and discharge mechanism 50 that supplies the jig 25 for laminating the workpieces 1 on the lamination stage 221 and discharges the jig 25 together with a plurality of types of the workpieces 1 for which lamination is completed (see FIG. 6C). That is, when the workpieces 1 are laminated, the jig 25 is supplied onto the lamination stage 221 by the jig supply and discharge mechanism 50, and a plurality of types of the workpieces 1 are sequentially laminated on the jig 25 by the above-described method.

Further, when a desired laminate in which a plurality of types of the workpieces 1 are laminated is manufactured, the jig supply and discharge mechanism 50 discharges the laminate in which a plurality of types of the workpieces 1 are laminated together with the jig 25 (see FIG. 6C). Operation of the jig supply and discharge mechanism 50 is controlled by the control unit 30. The jig supply and discharge mechanism 50 discharges the jig 25 together with a plurality of types of the workpieces 1 for which lamination is completed, so that it is easy to take out a plurality of types of the workpieces 1 for which lamination is completed. Further, after the jig 25 is discharged, a next one of the jig 25 is supplied onto the lamination stage 221. In this manner, lamination of a new one of the workpiece 1 can be started immediately, so that lamination efficiency of the workpiece 1 can be further improved.

Here, the lamination stage 221 has a fixing member for fixing the jig 25. Since the lamination stage 221 has the fixing member for fixing the jig 25, it is possible to further suppress positional displacement when the workpiece 1 is laminated on the jig 25.

Figure 6A:
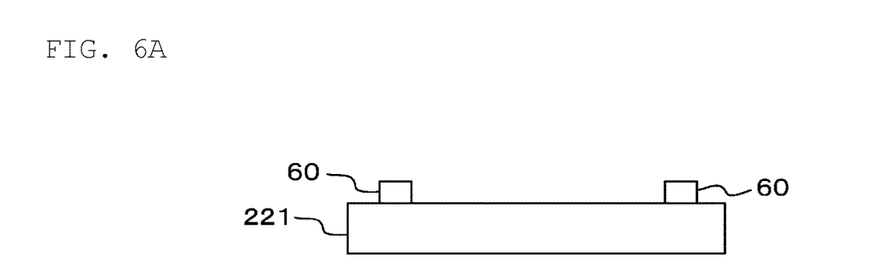
FIG. 6A is a side view schematically illustrating a lamination stage including a positioning pin as a fixing member.
Figure 6B:
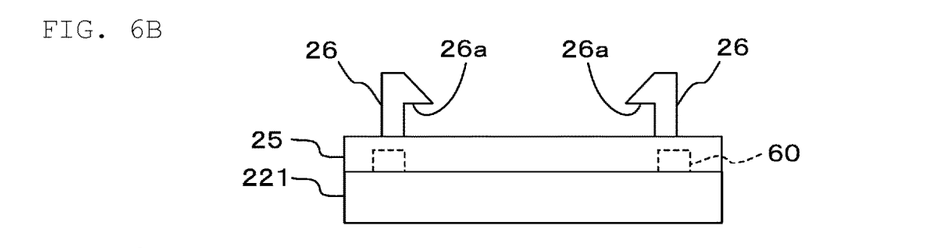
FIG. 6B is a side view illustrating a state in which a jig on the lamination stage is fixed by the positioning pin.
Figure 6C:
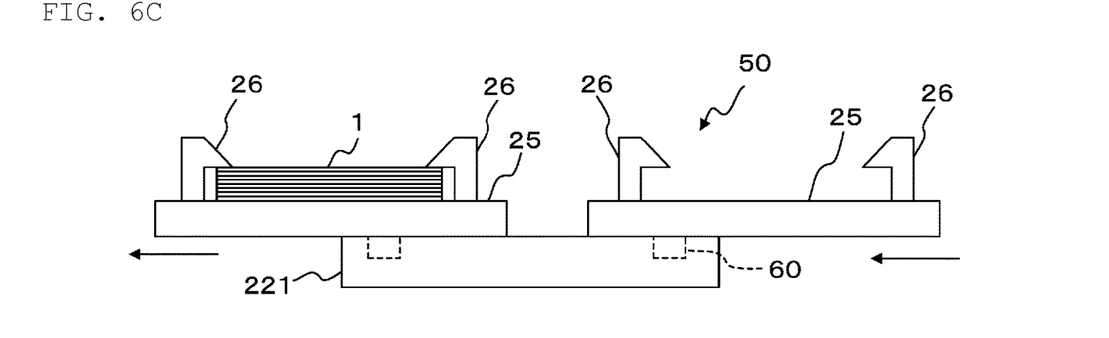
FIG. 6C is a diagram illustrating a state in which the jig is discharged together with a laminated workpiece by a jig supply and discharge mechanism and a next jig is supplied onto the lamination stage.

In the present embodiment, as illustrated in FIG. 6A, the fixing member is a positioning pin 60 that can be fitted into and separated from a recess formed in the jig 25. The positioning pin 60 is configured to be movable up and down so as to be able to protrude and retract with respect to a surface of the lamination stage 221. When the jig 25 is fixed, the positioning pin 60 is fitted into a recess formed in the jig 25 in a state of protruding from a surface of the lamination stage 221, so that the jig 25 is fixed (see FIG. 6B). In this manner, the jig 25 can be more reliably fixed to the lamination stage 221.

Further, when the jig 25 is discharged and supplied, the positioning pin 60 is lowered and retracted from a surface of the lamination stage 221, so that a fixed state of the jig 25 is released (see FIG. 6C). With such a configuration, it is possible to easily supply and discharge the jig 25.

However, the fixing member for fixing the jig 25 is not limited to the positioning pin 60 described above.

As described above, according to the lamination device 100 of the first embodiment, the supply mechanism 10 corrects a relative position of the workpiece 1 supplied at the supply positions A1 to A4 with respect to the lamination stage 221, and the workpiece 1 whose relative position is corrected is laminated on the lamination stage 221 of the mover 22. After the above, the mover 22 moves to a next one of the supply positions A1 to A4. That is, since the process of transferring the workpiece 1 to another mechanism only needs to be performed once, from the supply mechanism 10 to the movement mechanism 20, lamination time of the workpiece 1 can be shortened. Further, when the workpiece 1 is laminated on the lamination stage 221 of the mover 22, the workpiece 1 is laminated after position correction is performed. For this reason, it is not necessary to separately perform position correction after that. Therefore, lamination efficiency can be improved, and lamination time can be shortened.

Further, according to the lamination device 100 of the first embodiment, each of the first supply mechanism 10a, the second supply mechanism 10b, the third supply mechanism 10c, and the fourth supply mechanism 10d only needs to continuously supply one type of the workpiece 1, and thus, operation is simplified.

As described above, in the lamination device 100 according to the present embodiment, the number of the movers 22 is twice the number of the supply mechanisms 10. While each of the movers 22 is stopped in each of the supply mechanisms 10 and the workpiece 1 is laminated, another one of the mover 22 can move between the supply positions A1 to A4. Accordingly, lamination efficiency of the workpiece 1 can be further improved. Note that, when another one of the movers 22 moves between the supply positions A1 to A4, position correction may be performed again on the laminated workpieces 1.

Figure 7:
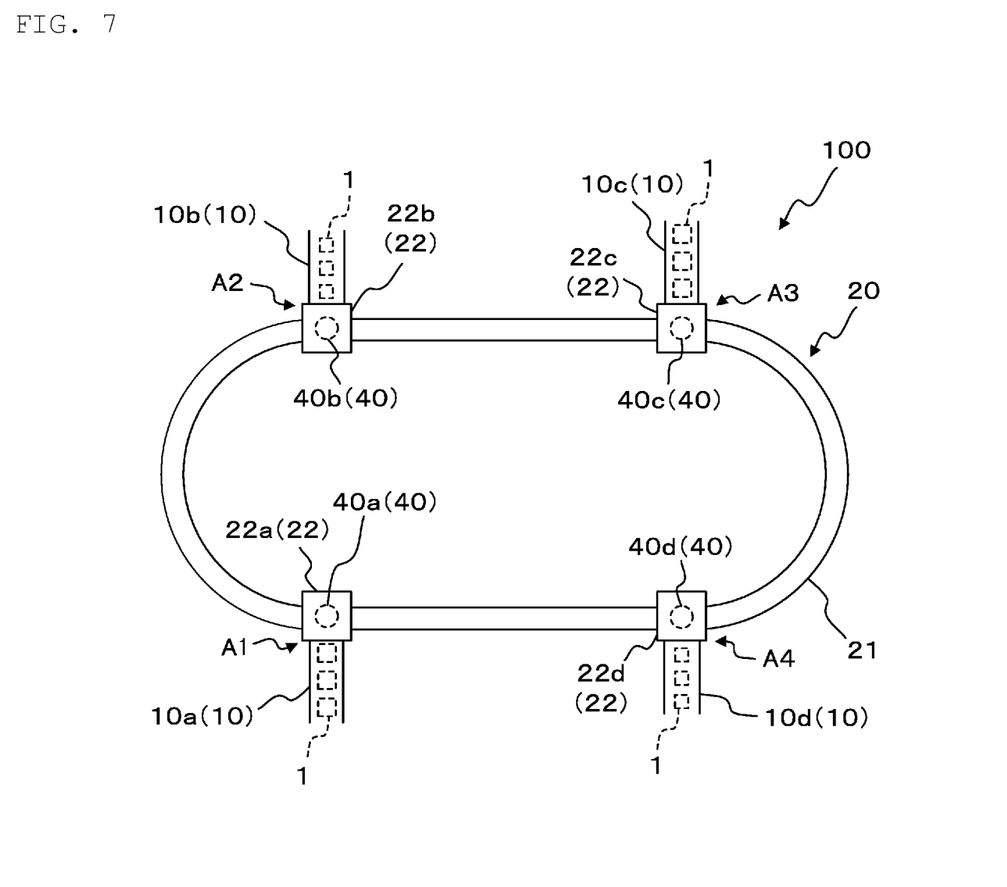
FIG. 7 is a plan view schematically illustrating a configuration of the lamination device in a case where the number of the movers is the same as the number of supply mechanisms.

Note that, as illustrated in FIG. 7, the number of the movers 22 may be the same as the number of the supply mechanisms 10. Even in this case, the workpiece 1 supplied by each of the supply mechanisms 10 can be simultaneously laminated on each of the lamination stages 221 of the same number of movers 22. Therefore, since it is possible to simultaneously laminate a plurality of types of the workpieces 1 according to the number of the supply mechanisms 10, lamination efficiency of the workpiece 1 can be improved as compared with a configuration in which the number of the movers 22 is smaller than the number of the supply mechanisms 10. Further, since all the movers 22 can be stopped and moved simultaneously, the possibility of collision between the movers 22 can be reduced.

Second Embodiment

The lamination device 100 according to the first embodiment is configured such that the lamination stage 221 moves in order to correct a relative position of the workpiece 1 with respect to the lamination stage 221.

On the other hand, in a lamination device 100A according to a second embodiment, in order to correct a relative position of the workpiece 1 with respect to the lamination stage 221, the supply mechanism 10, the mover 22, and the lamination stage 221 are configured to move.

Figure 8:
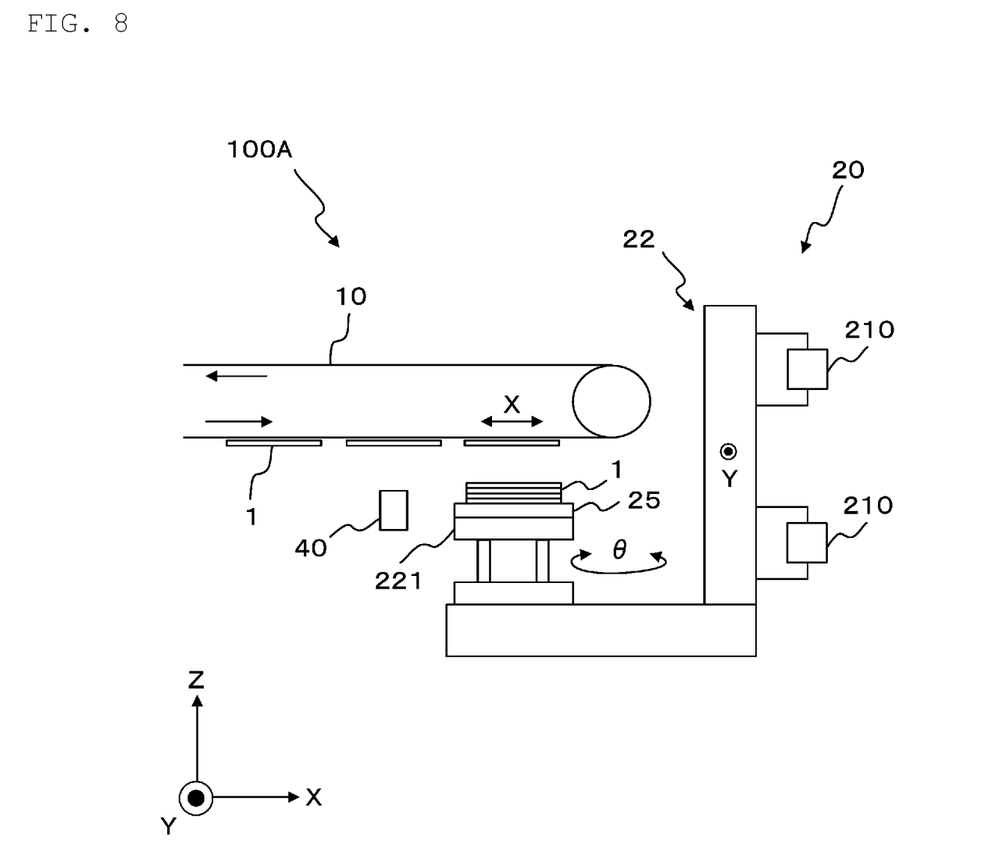
FIG. 8 is a diagram for explaining a method of correcting a relative position of a workpiece with respect to the lamination stage in the lamination device according to a second embodiment.

FIG. 8 is a diagram for explaining a method of correcting a relative position of the workpiece 1 with respect to the lamination stage 221 in the lamination device 100A according to the second embodiment.

The imaging device 40 images the workpiece 1 at a position before a supply position in a conveyance direction (X-axis direction in FIG. 8) of the workpiece 1 by the supply mechanism 10. The control unit 30 determines a supply position based on an image of the workpiece 1 captured by the imaging device 40, and performs first control of controlling the supply mechanism 10 so that the workpiece 1 stops at a determined supply position. By the first control, a position in the X-axis direction in a relative position of the workpiece 1 with respect to the lamination stage 221 is adjusted.

The control unit 30 also determines a stop position of the mover 22 on the basis of an image of the workpiece 1 captured by the imaging device 40, and performs second control of controlling the mover 22 to stop at a determined stop position. By the second control, a position in the Y-axis direction in a relative position of the workpiece 1 with respect to the lamination stage 221 is adjusted.

The control unit 30 also performs third control of adjusting a position of the lamination stage 221 on the basis of an image of the workpiece 1 captured by the imaging device 40. In the third control, control is performed to move the lamination stage 221 in the θ direction which is a rotation direction around the center of the lamination stage 221 on the XY plane.

A relative position of the workpiece 1 with respect to the lamination stage 221 is corrected by the first control, the second control, and the third control described above. When the relative position correction of the workpiece 1 with respect to the lamination stage 221 is completed, the control unit 30 raises the lamination stage 221 as in the first embodiment, and laminates the workpiece 1 on the lamination stage 221, more specifically, on the jig 25 on the lamination stage 221. At this time, as in the first embodiment, a moving amount in the Z-axis direction, that is, a raising amount, of the lamination stage 221 is controlled based on the number of the laminated workpieces 1 laminated on the jig 25.

Hereinafter, a method of sequentially laminating four types of the workpieces 1 by the lamination device 100A according to the second embodiment will be described. Here, operation in which the first mover 22a of eight of the movers 22 laminates the workpiece 1 will be described. However, the same applies to operation in which the other movers 22b to 22h laminate the workpiece 1.

(S21) The control unit 30 controls the first imaging device 40a so that a resin film as the workpiece 1 is imaged at a position before the first supply position A1 in the conveyance direction of the workpiece 1 by the first supply mechanism 10a. The control unit 30 performs first control of determining the first supply position A1 on the basis of an image of the workpiece 1 captured by the first imaging device 40a and controlling the first supply mechanism 10a so that the workpiece 1 stops at the determined first supply position A1, second control of determining a stop position of the first mover 22a on the basis of the image of the workpiece 1 captured by the first imaging device 40a and controlling the first mover 22a so as to stop at the determined stop position, and third control of adjusting a position in the θ direction of the lamination stage 221 on the basis of the image of the workpiece 1 captured by the first imaging device 40a. After the above, similarly to the first embodiment, the control unit 30 raises the lamination stage 221 to laminate the workpiece 1 on the jig 25 on the lamination stage 221.

Positions of the other movers 22b to 22h when the first mover 22a is stopped at the first supply position A1 are similar to those in the first embodiment.

(S22) Subsequently, the control unit 30 moves the first mover 22a from the first supply position A1 to the second supply position A2. Operation of the other movers 22b to 22h is similar to that in the first embodiment.

(S23) Subsequently, the control unit 30 controls the second imaging device 40b to image the first metal foil as the workpiece 1 at a position before the second supply position A2 in the conveyance direction of the workpiece 1 by the second supply mechanism 10b. The control unit 30 performs first control of determining a supply position on the basis of an image of the workpiece 1 captured by the second imaging device 40b and controlling the second supply mechanism 10b so that the workpiece 1 stops at the determined supply position, second control of determining a stop position of the first mover 22a on the basis of the image of the workpiece 1 captured by the second imaging device 40b and controlling the first mover 22a so as to stop at the determined stop position, and third control of adjusting a position in the θ direction of the lamination stage 221 on the basis of the image of the workpiece 1 captured by the second imaging device 40b. After the above, similarly to the first embodiment, the control unit 30 raises the lamination stage 221 to laminate the workpiece 1 on the jig 25 on the lamination stage 221.

Positions of the other movers 22b to 22h when the first mover 22a is stopped at the second supply position A2 are similar to those in the first embodiment.

(S24) Subsequently, the control unit 30 moves the first mover 22a from the second supply position A2 to the third supply position A3. Operation of the other movers 22b to 22h is similar to that in the first embodiment.

(S25) Subsequently, the control unit 30 controls the third imaging device 40c so that a resin film as the workpiece 1 is imaged at a position before the third supply position A3 in the conveyance direction of the workpiece 1 by the third supply mechanism 10c. The control unit 30 performs first control of determining the third supply position A3 on the basis of an image of the workpiece 1 captured by the third imaging device 40c and controlling the third supply mechanism 10c so that the workpiece 1 stops at the determined third supply position A3, second control of determining a stop position of the first mover 22a on the basis of the image of the workpiece 1 captured by the third imaging device 40c and controlling a position of the first mover 22a so as to stop at the determined stop position, and third control of adjusting a position of the lamination stage 221 in the θ direction on the basis of the image of the workpiece 1 captured by the third imaging device 40c. After the above, similarly to the first embodiment, the control unit 30 raises the lamination stage 221 to laminate the workpiece 1 on the jig 25 on the lamination stage 221.

The positions of the other movers 22b to 22h when the first mover 22a is stopped at the third supply position A3 are similar to those in the first embodiment.

(S26) Subsequently, the control unit 30 moves the first mover 22a from the third supply position A3 to the fourth supply position A4. Operation of the other movers 22b to 22h is similar to that in the first embodiment.

(S27) Subsequently, the control unit 30 controls the fourth imaging device 40d to image the second metal foil as the workpiece 1 at a position before the fourth supply position A4 in the conveyance direction of the workpiece 1 by the fourth supply mechanism 10d. The control unit 30 performs first control of determining the fourth supply position A4 on the basis of an image of the workpiece 1 captured by the fourth imaging device 40d and controlling the fourth supply mechanism 10d such that the workpiece 1 stops at the determined fourth supply position A4, second control of determining a stop position of the first mover 22a on the basis of the image of the workpiece 1 captured by the fourth imaging device 40d and controlling the first mover 22a so as to stop at the determined stop position, and third control of adjusting a position in the θ direction of the lamination stage 221 on the basis of the image of the workpiece 1 captured by the fourth imaging device 40d. After the above, similarly to the first embodiment, the control unit 30 raises the lamination stage 221 to laminate the workpiece 1 on the jig 25 on the lamination stage 221.

The positions of the other movers 22b to 22h when the first mover 22a is stopped at the fourth supply position A4 are similar to those in the first embodiment.

(S28) Subsequently, the control unit 30 moves the first mover 22a from the fourth supply position A4 to the first supply position A1. Operation of the other movers 22b to 22h is similar to that in the first embodiment.

By the processes (S21) to (S28) described above, a set of semi-finished products in which the resin film, the first metal foil, the resin film, and the second metal foil, which are four types of the workpieces 1, are laminated in this order is obtained. After the above, by repeatedly performing the processes (S21) to (S28), a product in which a predetermined number of sets are laminated, that is, a laminate in which a plurality of positive electrodes and a plurality of negative electrodes are alternately laminated with a resin film functioning as a separator interposed between them is obtained.

Also in the lamination device 100A according to the second embodiment, the process of transferring the workpiece 1 to another mechanism only needs to be performed once, from the supply mechanism 10 to the movement mechanism 20, and when the workpiece 1 is laminated on the lamination stage 221 of the mover 22, the lamination is performed after position correction is performed. For this reason, it is not necessary to separately perform the position correction after that. Therefore, lamination time of the workpiece 1 can be shortened.

In particular, according to the lamination device 100A of the second embodiment, the control unit 30 corrects a relative position of the workpiece 1 with respect to the lamination stage 221 by performing the first control of determining a supply position on the basis of an image of the workpiece 1 captured by the imaging device 40 and controlling the supply mechanism 10 so that the workpiece 1 stops at the determined supply position, the second control of determining a stop position of the mover 22 on the basis of the image of the workpiece 1 captured by the imaging device 40 and controlling the mover 22 so as to stop at the determined stop position, and the third control of controlling a position of the lamination stage 221 on the basis of the image of the workpiece 1 captured by the imaging device 40. The lamination device 100 according to the first embodiment needs a drive source for moving the lamination stage 221 in the X-axis direction, the Y-axis direction, and the θ direction, but the lamination device 100A according to the second embodiment only needs a drive source for moving the lamination stage 221 only in the 0 direction, so that the configuration of the mover 22 can be simplified.

The present disclosure is not limited to the above embodiment, and various applications and variations can be applied within the scope of the present disclosure. For example, the workpiece 1 which is an object to be laminated is not limited to the above-described sheet-shaped battery material. For example, the workpiece 1 is a sheet-like conductive layer and insulating layer, and a multilayer substrate can be produced by laminating a plurality of the workpieces 1. In this case, the conductive layer is made from, for example, copper, silver, an alloy containing copper, an alloy containing silver, Sn—Ag-based solder, or the like, and the insulating layer is made from, for example, thermoplastic resin such as a liquid crystal polymer, polyether ether ketone, polyether imide, or polyimide, or thermosetting resin such as epoxy resin or unsaturated polyester.

In the above-described embodiment, the lamination stage 221 is configured to be raised to approach the supply mechanism 10 in order to laminate the workpiece 1. However, the supply mechanism 10 may be lowered to approach the lamination stage 221.

In the lamination device 100A of the second embodiment, the supply mechanism 10 may be configured to move in the θ direction instead of the lamination stage 221 moving in the θ direction which is a rotation direction.

Figure 9:
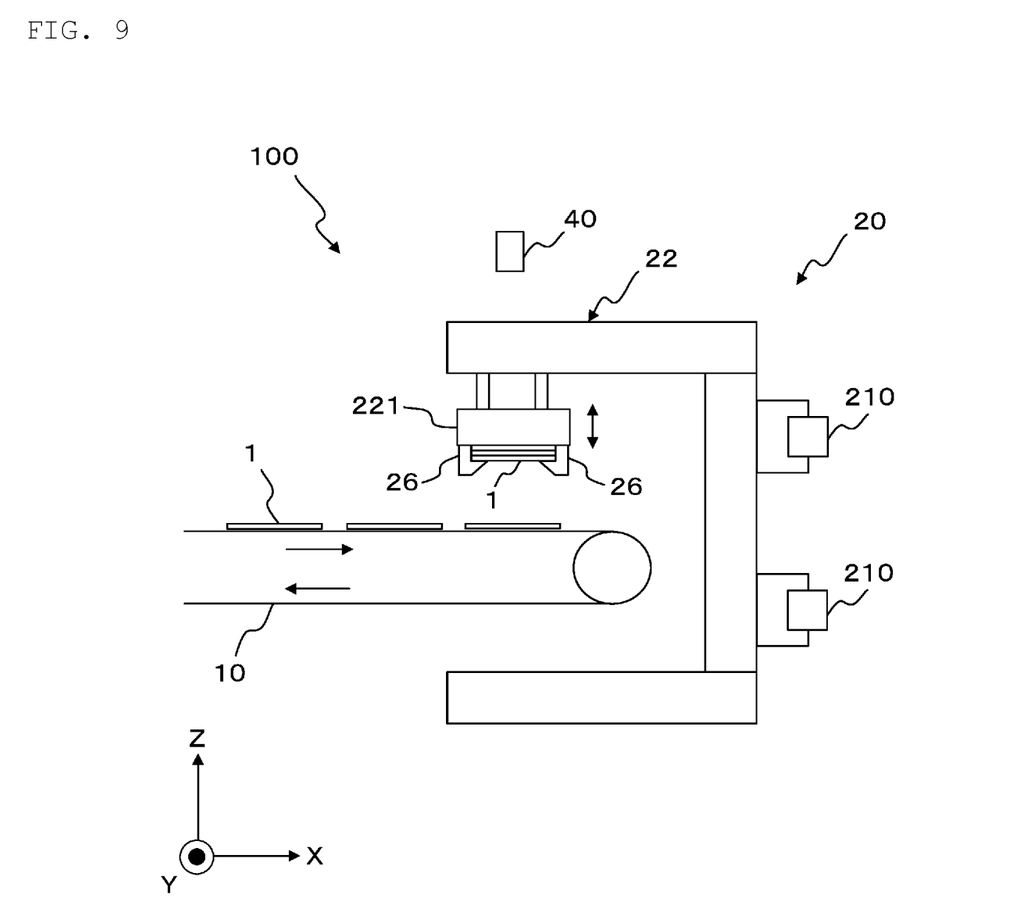
FIG. 9 is a diagram schematically illustrating a configuration of the mover in which the lamination stage is positioned vertically above a workpiece at a supply position when the workpiece is laminated.

In the above-described embodiment, at the time of lamination of the workpiece 1, the lamination stage 221 is located vertically below the workpieces 1 supplied to the supply positions A1 to A4, and is configured to approach the workpieces 1 by being raised (see FIG. 2). On the other hand, as illustrated in FIG. 9, when the workpiece 1 is laminated, the lamination stage 221 may be configured to be located vertically above the workpiece 1 supplied to the supply positions A1 to A4, and be lowered to approach the workpiece 1. In this case, the supply mechanism 10 is, for example, a belt conveyor, and conveys and supplies the workpiece 1 placed on a belt to the supply positions A1 to A4. The lamination stage 221 includes the chucking jaw 26 for holding the workpiece 1, and the laminated workpiece 1 is held by the chucking jaw 26 so as not to fall. Note that the workpiece 1 may be laminated on the lamination stage 221 by raising the supply mechanism 10 instead of lowering the lamination stage 221.

In the above-described embodiment, the control unit 30 corrects a relative position of the workpiece 1 with respect to the lamination stage 221 on the basis of an image of the workpiece 1 captured by the imaging device 40, but can also correct the position without using the image of the workpiece 1. For example, the supply mechanism 10 conveys the workpiece 1 so as not to cause positional displacement of the workpiece 1, and the control unit 30 accurately stops the mover 22 at each of the supply positions A1 to A4 on the basis of an encoder value indicating position information of the mover 22. Further, for example, a position of the workpiece 1 may be recognized by detection of a height direction by a laser sensor so that a relative position of the workpiece 1 with respect to the lamination stage 221 is corrected.

What is claimed is:

1. A lamination device that is configured to laminate a plurality of types of workpieces, the lamination device comprising:
   a plurality of supply mechanisms configured to supply the workpiece to each of a plurality of supply positions;
   a movement mechanism including a stator of a linear motor having a predetermined traveling track and a mover of a linear motor movable between a plurality of the supply positions along the traveling track, the mover including a lamination stage configured to laminate the workpieces; and
   a controller configured to control at least the mover,
   the controller is configured to correct a relative position of the workpiece supplied to the supply position with respect to the lamination stage of the mover, configured to laminate the workpiece whose relative position is corrected on the lamination stage, and configured to control the mover to move to a next one of the supply positions after laminating the workpiece, and
   the controller is configured to raise the lamination stage and control a raising amount of the lamination stage based on a number of the laminated workpieces laminated on the lamination stage.

2. The lamination device according to claim 1, wherein the controller is configured to move the lamination stage of the mover in order to correct a relative position of the workpiece with respect to the lamination stage.

3. The lamination device according to claim 2, further comprising:
   an imaging device configured to image the workpiece supplied by the supply mechanism, wherein
   the controller is configured to move the lamination stage of the mover based on an image of the workpiece captured by the imaging device.

4. The lamination device according to claim 1, further comprising:
   an imaging device configured to image the workpiece supplied by the supply mechanism, wherein
   the controller is configured to correct a relative position of the workpiece with respect to the lamination stage by performing:
   first control of determining the supply position based on an image of the workpiece captured by the imaging device and controlling the supply mechanism so that the workpiece stops at the supply position that is determined,
   second control of determining a stop position of the mover based on the image of the workpiece captured by the imaging device and controlling the mover so as to stop at the stop position that is determined, and
   third control of controlling the lamination stage based on the image of the workpiece captured by the imaging device.

5. The lamination device according to claim 1, wherein a number of the movers is twice a number of the supply mechanisms.

6. The lamination device according to claim 1, wherein a number of the movers is the same as a number of the supply mechanisms.

7. The lamination device according to claim 1, further comprising:
   a jig supply and discharge mechanism configured to supply a jig for laminating the workpiece on the lamination stage and configured to discharge the jig together with a plurality of types of the workpieces for which lamination is completed.

8. The lamination device according to claim 7, wherein the lamination stage includes a fixing member configured to fix the jig.

9. The lamination device according to claim 8, wherein the fixing member is a positioning pin that is configured to fit to and separate from a recess in the jig.

10. The lamination device according to claim 2, wherein a number of the movers is twice a number of the supply mechanisms.

11. The lamination device according to claim 3, wherein a number of the movers is twice a number of the supply mechanisms.

12. The lamination device according to claim 4, wherein a number of the movers is twice a number of the supply mechanisms.

13. The lamination device according to claim 2, wherein a number of the movers is the same as a number of the supply mechanisms.

14. The lamination device according to claim 3, wherein a number of the movers is the same as a number of the supply mechanisms.

15. The lamination device according to claim 4, wherein a number of the movers is the same as a number of the supply mechanisms.

16. The lamination device according to claim 2, further comprising:
a jig supply and discharge mechanism configured to supply a jig for laminating the workpiece on the lamination stage and configured to discharge the jig together with a plurality of types of the workpieces for which lamination is completed.

17. The lamination device according to claim 3, further comprising:
a jig supply and discharge mechanism configured to supply a jig for laminating the workpiece on the lamination stage and configured to discharge the jig together with a plurality of types of the workpieces for which lamination is completed.

18. The lamination device according to claim 4, further comprising:
a jig supply and discharge mechanism configured to supply a jig for laminating the workpiece on the lamination stage and configured to discharge the jig together with a plurality of types of the workpieces for which lamination is completed.

19. The lamination device according to claim 5, further comprising:
a jig supply and discharge mechanism configured to supply a jig for laminating the workpiece on the lamination stage and configured to discharge the jig together with a plurality of types of the workpieces for which lamination is completed.

20. The lamination device according to claim 6, further comprising:
a jig supply and discharge mechanism configured to supply a jig for laminating the workpiece on the lamination stage and configured to discharge the jig together with a plurality of types of the workpieces for which lamination is completed.

21. A lamination device that is configured to laminate a plurality of types of workpieces, the lamination device comprising:
a plurality of supply mechanisms configured to supply the workpiece to each of a plurality of supply positions;
a movement mechanism including a stator of a linear motor having a predetermined traveling track and a mover of a linear motor movable between a plurality of the supply positions along the traveling track, the mover including a lamination stage configured to laminate the workpieces;
a jig supply and discharge mechanism configured to supply a jig for laminating the workpiece on the lamination stage and configured to discharge the jig together with a plurality of types of the workpieces for which lamination is completed; and
a controller configured to control at least the mover, and the controller is configured to correct a relative position of the workpiece supplied to the supply position with respect to the lamination stage of the mover, configured to laminate the workpiece whose relative position is corrected on the lamination stage, and configured to control the mover to move to a next one of the supply positions after laminating the workpiece.

22. The lamination device according to claim 21, wherein the lamination stage includes a fixing member configured to fix the jig.

23. The lamination device according to claim 22, wherein the fixing member is a positioning pin that is configured to fit to and separate from a recess in the jig.

* * * * *